United States Patent [19]

Peterson

[11] 4,219,343

[45] Aug. 26, 1980

[54] FILTER BAG RETAINING SYSTEM WITH REMOVABLE THIMBLE EXTENSION

[75] Inventor: Harley G. Peterson, La Crescenta, Calif.

[73] Assignee: Joy Manufacturing Company, Pittsburgh, Pa.

[21] Appl. No.: 27,181

[22] Filed: Apr. 4, 1979

[51] Int. Cl.² .............................................. B01D 46/02

[52] U.S. Cl. ................................. 55/378; 55/341 NT; 55/418

[58] Field of Search .......... 55/341 NT, 341 M, 341 H, 55/368, 374, 375, 378, 418, DIG. 26, 341 R

[56] References Cited

U.S. PATENT DOCUMENTS

| | | | |
|---|---|---|---|
| 530,553 | 12/1894 | Rourke | 55/341 NT |
| 1,240,305 | 9/1917 | Brooks et al. | 55/341 M |
| 2,792,074 | 5/1957 | Schilb et al. | 55/341 NT |
| 3,901,671 | 8/1975 | Kitami | 55/341 NT |

FOREIGN PATENT DOCUMENTS

| | | | |
|---|---|---|---|
| 183946 | 9/1906 | Fed. Rep. of Germany | 55/DIG. 26 |
| 488129 | 7/1938 | United Kingdom | 55/DIG. 26 |

*Primary Examiner*—David L. Lacey
*Attorney, Agent, or Firm*—Thomas H. Murray

[57] ABSTRACT

A removable extension for thimbles used in baghouse installations. The extension, which projects below the main body of the thimble, insures that gas entering a filter bag connected to the thimble will have a flow direction aligned with the bag axis such that particulate matter entrained within the gas stream will not impinge on the sides of the filter bag and cause excessive wear. The extension, which need not be secured to the main body of the thimble, abuts the inner wall surface of the thimble and rests on an annular flange formed in the upper portion of the thimble.

4 Claims, 3 Drawing Figures

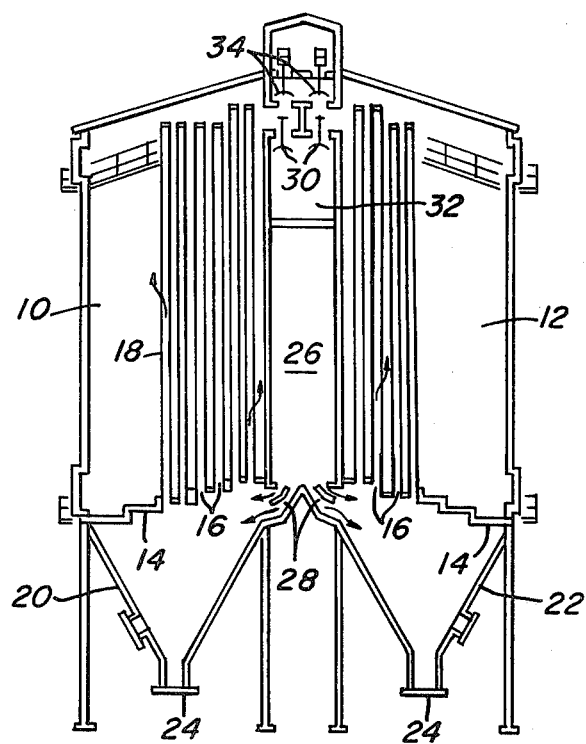
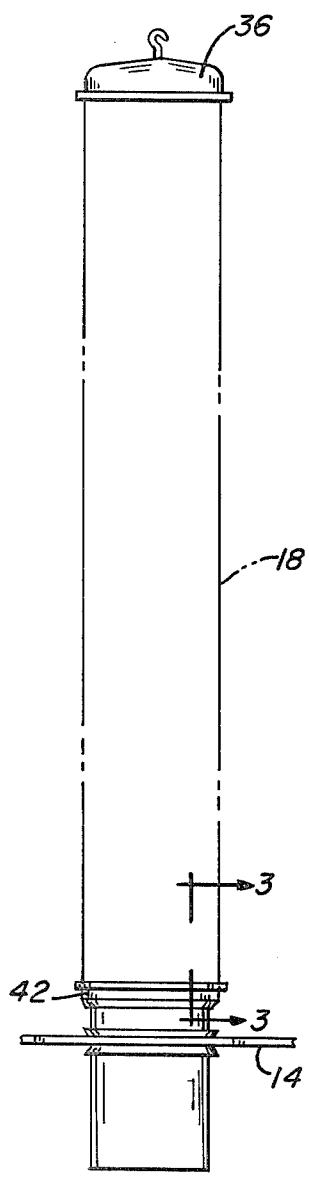
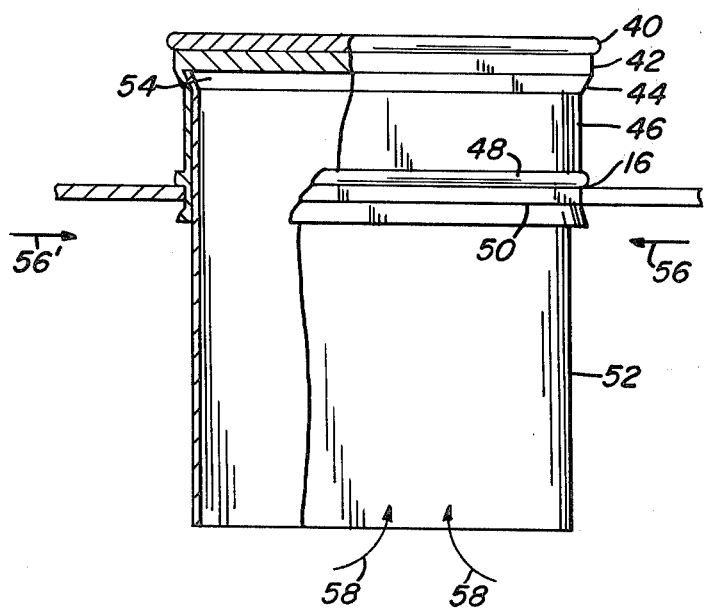

FILTER BAG RETAINING SYSTEM WITH REMOVABLE THIMBLE EXTENSION

BACKGROUND OF THE INVENTION

As is known, baghouses are used extensively in power generating stations and the like for air pollution control. In a baghouse of this type, dust-laden air enters a plenum chamber and then flows upwardly through apertures in an upper wall of the plenum chamber and into a plurality of vertically-elongated tubular filter bags which separate the dust from the air as it flows through the fabric walls of the bags. The bottom of each filter bag is open and is secured to the periphery of a thimble which extends upwardly from the upper wall of the plenum chamber and surrounds an associated one of the aforesaid apertures. In the usual case, the bottom of the thimble is essentially flush with the upper wall of the plenum chamber.

When gas in the plenum chamber exits through the aperture and the thimble into the filter bag, part of the gas approaches along the center line of the exit path through the aperture; however another part comes toward the aperture radially along the underside of the upper wall of the plenum from all directions. The part approaching along the underside of the upper wall has momentum toward the center of the aperture with the result that this portion of the entering air may not be fully turned into alignment with the bag axis. As a result, it will strike the fabric of the filter bag at a greater angle of incidence. Particles carried by the gas stream will then strike a grazing blow on the fabric and increase wear rate.

The problem of bag wear due to the incidence of air entering the thimble in a sideways or radial direction can be alleviated by extending the thimble beneath the upper wall of the plenum chamber in order that the entire cross section of the airstream, when it intersects the bottom of the bag, will be essentially parallel to the longitudinal axis of the bag. In the past, thimble extensions of this type have normally comprised an integral part of the thimble itself; and, consequently, were formed from sheet metal of the same gage or thickness as the main portion of the thimble which must be heavy enough to withstand the pull of the bag, handling stresses and welding requirements.

SUMMARY OF THE INVENTION

The present invention resides in the discovery that an effective thimble extension can be provided which is not an integral part of the thimble itself, which is of lighter gage than the main body of the thimble, and which can be readily inserted or dropped into the thimble and retained in place without the need of any auxiliary fastening elements. The upper end of the thimble extension is flared outwardly; and this flared portion rests on a shoulder formed in the upper portion of the main body of the thimble. In addition to being lightweight, the extension can be readily removed from the thimble in the event that, under certain operating conditions, it may not be required.

The above and other objects and features of the invention will become apparent from the following detailed description taken in connection with the accompanying drawings which form a part of this specification, and in which:

FIG. 1 is a schematic cross-sectional view of a baghouse with which the present invention may be used;

FIG. 2 is an illustration of one of the filter bags used in the baghouse of FIG. 1, showing its connection to a thimble at the bottom of the filter and to a tensioning device at the top; and FIG. 3 is a broken-away cross-sectional view of the thimble incorporating the removable thimble extension of the invention.

With reference now to the drawings, and particularly to FIG. 1, the baghouse shown includes a pair of gas-filtering chambers 10 and 12 each provided with a lower, stepped bottom wall 14. Formed in each bottom wall 14 is a plurality of openings or apertures 16 which are provided with a surrounding thimble, about to be described. Secured to each of the thimbles is the bottom periphery of an enlarged filter bag 18 which extends throughout the entire length of an associated one of the gas-filtering chambers 10 or 12. Beneath each of the walls 14 is a hopper 20 or 22 which collects particulate materials separated from the entering gas stream and is provided at its lower end with a discharge opening 24.

During a gas-filtering operation, dust-laden air enters the baghouse through a gas inlet chamber 26 and then passes through openings 28 into the respective ones of hoppers 20 and 22. In the hopper, the gas stream reverses its direction of movement and flows upwardly into the filter bags 18. Each of the filter bags is formed from a porous fabric material which permits the gas to pass therethrough while retaining the particulate material on the inner surface of the filter. After passing through the bag filters, the gas then flows through valves 30 to a gas outlet chamber 32. By manipulating the valves 30, as well as valves 34, the direction of airflow through the chambers 10 and 12 can be reversed, whereby the dust adhering to the inner periphery of each of the filters 18 can be blown downwardly into the hoppers 20 and 22.

The manner in which each bag 18 is suspended within an associated one of the chambers 10 or 12 is shown in FIG. 2. At the top, each bag is secured around its periphery to a bell 36 connected through a stainless steel tensioning device, not shown, to an upper support member. The bottom of the elongated filter bag is secured to an annular thimble 42 which surrounds an associated opening or aperture in the wall 14.

The improved thimble assembly of the invention is shown in FIG. 3. The thimble itself has an upper enlarged diameter portion including a curved lip 40 connected through section 42 to a tapered portion 44 which connects with the main annular body 46 of the thimble. At the bottom of the thimble is a second lip 48 and a recessed portion 50 which fits into a corresponding aperture 16 in the floor wall 14. Inserted into the thimble is a thimble extension 52 comprising a tubular member, formed of relatively thin sheet metal and having at its upper periphery a flanged, inclined section 54 which is of such diameter as to rest on the inclined portion 44 of the main thimble body. As a result, the extension 52 may simply be dropped into the thimble or removed, depending upon requirements, with the inclined portion 54 resting on inclined portion 44. It has been found that the extension 52 will remain in place without the need for any auxiliary fastening elements, notwithstanding the fact that air will flow upwardly through the extension and the thimble itself.

As was explained above, air in the plenum chamber 20 or 22 will approach the bottom of the thimble not only along the axis of the filter bag but also along the underside of the floor wall 14 as illustrated by the arrows 56. If the extension 52 is not inserted into the thimble, this air flowing at right angles to the axis of the thimble must make an essentially right angle turn in passing upwardly through the thimble and the filter and in so doing will strike the side of the filter bag. The particulate material entrained within the airstream will then cause excessive wear on the fabric of the filter bag.

By using the extension, however, air flowing along the underside of the floor 14 must now flow downwardly and then upwardly through the extension 52 as illustrated by the arrows 58; and while some of this air will impinge on the sides of the extension 52, the extension, being formed from metal, will not experience any deleterious effects.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In an apparatus for filtering particulate matter from a gaseous stream including a plenum having a wall provided with an aperture therein and said wall defining a raw gas chamber having a gas inlet opening and a filtered gas chamber having a gas outlet opening, a thimble secured to said wall and surrounding said aperture, an inwardly-inclined flange formed in the upper peripheral portion of said thimble, a vertically-extending tubular filter bag secured to said thimble and in flow-through communication with said plenum and extending into said filtered gas chamber, and a removable annular insert fitted into the interior of said thimble and having a portion which extends beneath the body of the thimble into said raw gas chamber such that gas flowing along said wall must flow downwardly and then upwardly through said annular insert before passing into said filter bag, said annular insert having an outwardly-flared flange portion at its upper periphery which rests on said first-mentioned flange.

2. The apparatus of claim 1 wherein said annular insert is in close abutting relationship with the inner periphery of said thimble.

3. The apparatus of claim 2 wherein said annular insert is constructed and arranged such that it is retained within said thimble by its own weight without the use of auxiliary fastening elements.

4. The apparatus of claim 1 wherein said gas inlet opening is positioned so as to direct air into the plenum such that at least part of said air flows along said wall.

* * * * *